(12) United States Patent  
Ripley

(10) Patent No.: US 11,583,933 B1  
(45) Date of Patent: *Feb. 21, 2023

(54) SHAPED CUTTING TOOL AND METHOD OF USE TO EFFICIENTLY FORM A FINISHED PART

(71) Applicant: Consolidated Nuclear Security, LLC, Oak Ridge, TN (US)

(72) Inventor: Edward B. Ripley, Knoxville, TN (US)

(73) Assignee: Consolidated Nuclear Security, LLC, Oak Ridge, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/798,525

(22) Filed: Feb. 24, 2020

Related U.S. Application Data

(63) Continuation-in-part of application No. 15/409,887, filed on Jan. 19, 2017, now Pat. No. 10,596,633.

(51) Int. Cl.
| | | |
|---|---|---|
| *B23B 1/00* | (2006.01) | |
| *B23B 27/04* | (2006.01) | |
| *B23B 27/06* | (2006.01) | |

(52) U.S. Cl.  
CPC ............ *B23B 27/06* (2013.01); *B23B 1/00* (2013.01); *B23B 27/04* (2013.01); *B23B 2220/24* (2013.01)

(58) Field of Classification Search  
CPC ..... B23B 27/04; B23B 27/06; B23B 27/1622; B23B 27/164; B23B 2220/24; B23B 2220/28; B23B 2220/445; B23B 27/045; B23B 29/043; B23B 2200/202; B23B 2200/207; B23B 27/1603; B23B 27/1611; B23B 27/16; Y10T 82/10;

(Continued)

(56) References Cited

U.S. PATENT DOCUMENTS

| 66,641 | A | * | 7/1867 | Shackleton | ............ | B23B 27/16 |
| | | | | | | 279/43.3 |
| 2,424,041 | A | * | 7/1947 | Luers | .................... | B23B 27/083 |
| | | | | | | 407/64 |

(Continued)

FOREIGN PATENT DOCUMENTS

| CH | 535083 A | * | 3/1973 | ........... | B23B 27/045 |
| EP | 0955116 B1 | * | 12/2001 | ........... | B23B 27/045 |

(Continued)

OTHER PUBLICATIONS

Description EP1375038A1 (translation) obtained at https://worldwide.espacenet.com/ (last visited Apr. 10, 2021).*

*Primary Examiner* — Ryan Rufo  
(74) *Attorney, Agent, or Firm* — Luedeka Neely Group, P.C.

(57) ABSTRACT

A method of efficiently forming a finished part, the method includes providing a cutting tool having a first cutting edge extending from a first end of the cutting tool, a second cutting edge extending from a second end of the cutting tool, and a shaping edge disposed between the first cutting edge and the second cutting edge. The cutting tool is advanced into a rotating workpiece such that the first cutting edge removes a trailing end of the rotating workpiece, the shaping edge shapes a working portion of the rotating workpiece, and the second cutting edge removes the working portion of the rotating workpiece to form the finished part.

11 Claims, 2 Drawing Sheets

(58) Field of Classification Search
CPC ....... B23C 2210/242; B23C 3/04; B23C 3/02; B23C 3/023; B23C 3/026; B23C 2220/08
See application file for complete search history.

(56) References Cited

U.S. PATENT DOCUMENTS

| | | | | |
|---|---|---|---|---|
| 2,632,233 | A * | 3/1953 | Luers | B23B 27/083 407/64 |
| 3,543,364 | A * | 12/1970 | Mackew | B23B 27/1685 407/87 |
| 3,662,445 | A * | 5/1972 | Whitaker | B23B 29/043 407/71 |
| 4,063,841 | A * | 12/1977 | Niman, Jr. | B23B 27/007 407/70 |
| 4,539,875 | A * | 9/1985 | Lee | B23B 27/1629 407/113 |
| 4,776,733 | A * | 10/1988 | Pettersson | B23B 27/045 407/114 |
| 5,135,336 | A * | 8/1992 | Noguchi | B23B 27/045 407/117 |
| 5,137,396 | A * | 8/1992 | Durschinger | B23B 27/045 407/116 |
| 5,275,071 | A * | 1/1994 | Plant | A23N 15/06 426/637 |
| 5,681,133 | A * | 10/1997 | Hibiske | B23B 27/06 407/102 |
| 10,010,939 | B2 * | 7/2018 | Inoue | B23B 27/22 |
| 2001/0014259 | A1 * | 8/2001 | Inayama | B23B 27/045 407/116 |
| 2003/0223830 | A1 * | 12/2003 | Bryan | B29C 59/022 407/119 |
| 2016/0107247 | A1 * | 4/2016 | Li | B23C 3/12 407/42 |
| 2019/0210122 | A1 * | 7/2019 | Fujita | C23C 14/3407 |

FOREIGN PATENT DOCUMENTS

| | | | | |
|---|---|---|---|---|
| EP | 1375038 A1 * | 1/2004 | | B23B 27/08 |
| FR | 320903 A * | 12/1902 | | B23B 27/1688 |
| GB | 551035 A * | 2/1943 | | B23C 5/242 |
| GB | 810512 A * | 3/1959 | | B23B 27/08 |
| JP | 2017136661 A * | 8/2017 | | |
| WO | WO-2008140191 A1 * | 11/2008 | | B23B 27/045 |
| WO | WO-2009031193 A1 * | 3/2009 | | F25C 5/12 |
| WO | WO-2010051945 A1 * | 5/2010 | | B23B 29/043 |

* cited by examiner

SHAPED CUTTING TOOL AND METHOD OF USE TO EFFICIENTLY FORM A FINISHED PART

CROSS REFERENCE TO RELATED APPLICATION

This application is a continuation-in-part of co-pending U.S. patent application Ser. No. 15/409,887 filed on Jan. 19, 2017, entitled "Cutting Tool," the contents of which is incorporated herein by reference in its entirety.

GOVERNMENT RIGHTS

The U.S. Government has rights to this invention pursuant to contract number DE-NA0001942 between the U.S. Department of Energy and Consolidated Nuclear Security, LLC.

FIELD

This disclosure relates to the field of cutting tools for machining rotating work pieces. More particularly, this disclosure relates to a shaped cutting tool designed to efficiently machine one or more finished parts from a rotating workpiece in minimal machining steps while preventing the wasting of material of the workpiece during the forming of the finished parts.

BACKGROUND

In lathe machining, a workpiece is rotated along a horizontal axis for cutting (i.e., shaping) of the workpiece, typically using a single-point cutting tool. A nearly finished workpiece still requires several machining steps to have material of the workpiece cut away to create/shape the desired finished part. These steps often include multiple passes of the workpiece with respect to the cutting tool where, for example, the positioning of the workpiece or cutting tool is changed after each pass and/or the cutting tool is replaced with another cutting tool having a different shape or size. These additional steps and passes increase the time and equipment needed in creating a finished product using turning operations. Further, the additional steps and passes often results in wasted material being removed from the workpiece. These inefficiencies often make the process of preparing and machining a particular shape prohibitively expensive.

Additionally, in certain machining operations, it may be desirable to perform a chemical analytical test on excess material from a machined part using the theory that the excess material will have the same chemical makeup as the machined part. In such situations, a machinist may take a sample from the excess material. For example, in casting operations, a small rectangular-shaped aliquot may be saw-cut from the casting lug. The sawing of the aliquot is a cost saving measure as compared to machining the aliquot on a lathe using the process described with various machine passes and/or different cutting tools. Due to the sawing process, the aliquot is rough on the sides and the ends. To further save money, the aliquot is often further cut into additional pieces using a pair of side cutters, which squeeze and deform the aliquot until it separates into the additional pieces. The pieces with the clipped ends are then typically used as samples for the analytical testing. Two problems with this sampling process are (1) it is time consuming to form the samples; and (2) the samples formed by sawing and clipping introduce uncertainty in the testing due to errors associated with the surface roughness.

What is needed therefore is a cutting tool configured to efficiently cut desired shapes out of a rotating workpiece with minimal machining steps.

Additionally, it is desired to provide a cutting tool that can efficiently cut one or more samples from excess material of a machined part (e.g., samples from a casting lug) such that the sample has an ideal geometry for chemical analytical testing.

SUMMARY

According to one embodiment of the disclosure, a method of efficiently forming a finished part includes providing a cutting tool, providing a rotating workpiece, and advancing the cutting tool into the workpiece. The cutting tool includes a first cutting edge extending from a first end of the cutting tool, a second cutting edge extending from a second end of the cutting tool, and a shaping edge disposed between the first cutting edge and the second cutting edge. The rotating workpiece includes a trailing end, a leading end, and a working portion disposed between the trailing end and the leading end. In operation, the cutting tool is advanced into the workpiece such that the first cutting edge removes the trailing end of the rotating workpiece, the shaping edge shapes the working portion of the rotating workpiece, and the second cutting edge removes the working portion of the rotating workpiece to form the finished part.

According to certain embodiments, the leading end of the rotating workpiece becomes a new trailing end after forming the finished part and the method further includes positioning an inner surface of the first cutting edge adjacent a top surface of the new trailing end of the rotating workpiece for preventing wasted material from being removed from the new trailing end; and advancing the cutting tool into the rotating workpiece such that the shaping edge shapes a second working portion of the rotating workpiece between the new trailing end and a new leading end of the rotating workpiece until the second cutting edge removes the second working portion of the rotating workpiece to form a second finished part.

According to certain embodiments, the first cutting edge has a length greater than the second cutting edge such that the leading end of the rotating workpiece is removed prior to the working portion of the rotating workpiece.

According to certain embodiments, the shaping edge is a concave curve and the finished part is one of a sphere and an oval. According to other embodiments, the shaping edge is substantially perpendicular to the first cutting edge and to the second cutting edge and the finished part is a cylinder.

According to certain embodiments, the cutting tool includes a cutting portion that consists of the first cutting edge, the second cutting edge, and the shaping edge.

According to certain embodiments, the finished part is substantially spherical and the method further includes performing a chemical analytical test on the finished part.

According to another embodiment of the disclosure, a method of efficiently forming a finished part includes providing a cutting tool, providing a rotating workpiece, and advancing the cutting tool into the rotating workpiece. According to this embodiment, the cutting tool has longitudinal axis and includes a first cutting edge, a second cutting edge, and a curved shaping edge. The first cutting includes a first sub-edge having a proximal end and a distal end. The second cutting edge includes a distal end. The proximal end of the first sub-edge and the distal end of the second cutting edge are disposed together on a plane that is substantially perpendicular to the longitudinal axis such that the distal end of the first sub-edge extends from the plane. The curved shaping edge extends from the proximal end of the first sub-edge to the distal end of the second cutting edge. The rotating workpiece includes a central axis, a trailing end, a leading end, and a working portion disposed between the trailing end and the leading end. In operation, the cutting tool is advanced into the rotating workpiece such that the first cutting edge removes the trailing end of the rotating workpiece when the distal end of the first sub-edge reaches the central axis of the rotating workpiece, the shaping edge shapes the working portion of the rotating workpiece, and the second cutting edge removes the working portion of the rotating workpiece to form the finished part when the distal end of the second cutting edge reaches the central axis of the rotating workpiece.

According to certain embodiments, the finished part is one of a sphere and an oval. In some embodiments, the shaping edge is a concave curve to form the finished part as one of a sphere and an oval. According to other embodiments, the finished part is substantially spherical and the method further includes performing a chemical analytical test on the finished part.

According to certain embodiments, the cutting tool includes a cutting portion that consists of the first cutting edge, the second cutting edge, and the shaping edge.

According to certain embodiments, the advancing step includes the first cutting edge removing the trailing end of the rotating workpiece prior to the second cutting edge removing the working portion of the rotating workpiece.

According to certain embodiments, the leading end of the rotating workpiece becomes a new trailing end after forming the finished part. According to this embodiment, the method further includes positioning the first sub-edge of the first cutting edge adjacent a top surface of the new trailing end of the rotating workpiece for preventing wasted material from being removed from the new trailing end; and advancing the cutting tool into the rotating workpiece such that the shaping edge shapes a second working portion of the rotating workpiece between the new trailing end and a new leading end of the rotating workpiece until the second cutting edge removes the second working portion of the rotating workpiece to form a second finished part.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
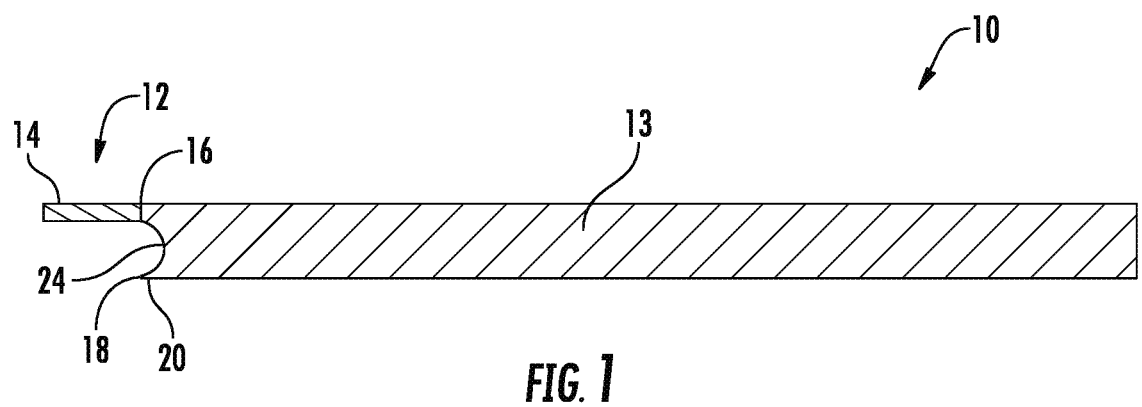
FIG. 1 depicts a side view of a cutting tool according to one embodiment of the disclosure positioned with the first cutting edge disposed above the second cutting edge.

Referring to FIG. 1, a cutting tool 10 is shown according to one embodiment of the disclosure. The cutting tool 10 generally includes a cutting portion 12 and a shank 13 configured to be secured to a tool holder (not shown) for machining a rotating workpiece. The cutting portion 12 includes a first cutting edge 14 extending from a first end 16 of the cutting portion 12 and a second cutting edge 18 extending from a second end 20 of the cutting portion 12. As described further below, the first cutting edge 14 is operable to remove a trailing end 32 of the rotating workpiece (see FIG. 2A) and the second cutting edge 18 is operable to remove a working portion 34 (see FIG. 2E) from the workpiece. As shown, the first cutting edge 14 preferably extends from the shank 13 a greater distance than the second cutting edge 18. In this preferred embodiment, the first cutting edge 14 is operable to remove the trailing end 32 of the workpiece before the second cutting edge 18 removes the working portion 34 from the workpiece. Removal of the trailing end 32 and working portion 34 from the workpiece forms a finished part 36.

Disposed substantially between the first cutting edge 14 and the second cutting edge 18 is a shaping edge 24. While the shaping edge 24 may take various forms and configurations, the shaping edge 24 is configured to create a desired shape of the working portion 34 of the rotating workpiece while the first cutting edge 14 operates to remove the trailing end 32 of the workpiece and the second cutting edge 18 operates to remove the working portion 34 from the workpiece. In other words, the cutting tool 10 is operable to create a desired shape of a finished part out of the working portion 34 of a rotating workpiece during the parting step, eliminating the need for subsequent machining steps and preventing wasted material caused by the subsequent machining steps. Thus, according to this embodiment, the cutting portion 12 of cutting tool 10 may consist of only the first cutting edge 14, the second cutting edge 18, and the shaping edge 24 therebetween as it is only these edges that perform any cutting of the workpiece (i.e., any other edges of the cutting tool 10 would not be considered part of the "cutting portion" 12). For purposes of the present disclosure, the "working portion" of the workpiece is the portion of the workpiece being shaped by the shaping edge 24 during the machining process while the "finished part" refers to the working portion after it is removed from the workpiece.

Figure 1A:
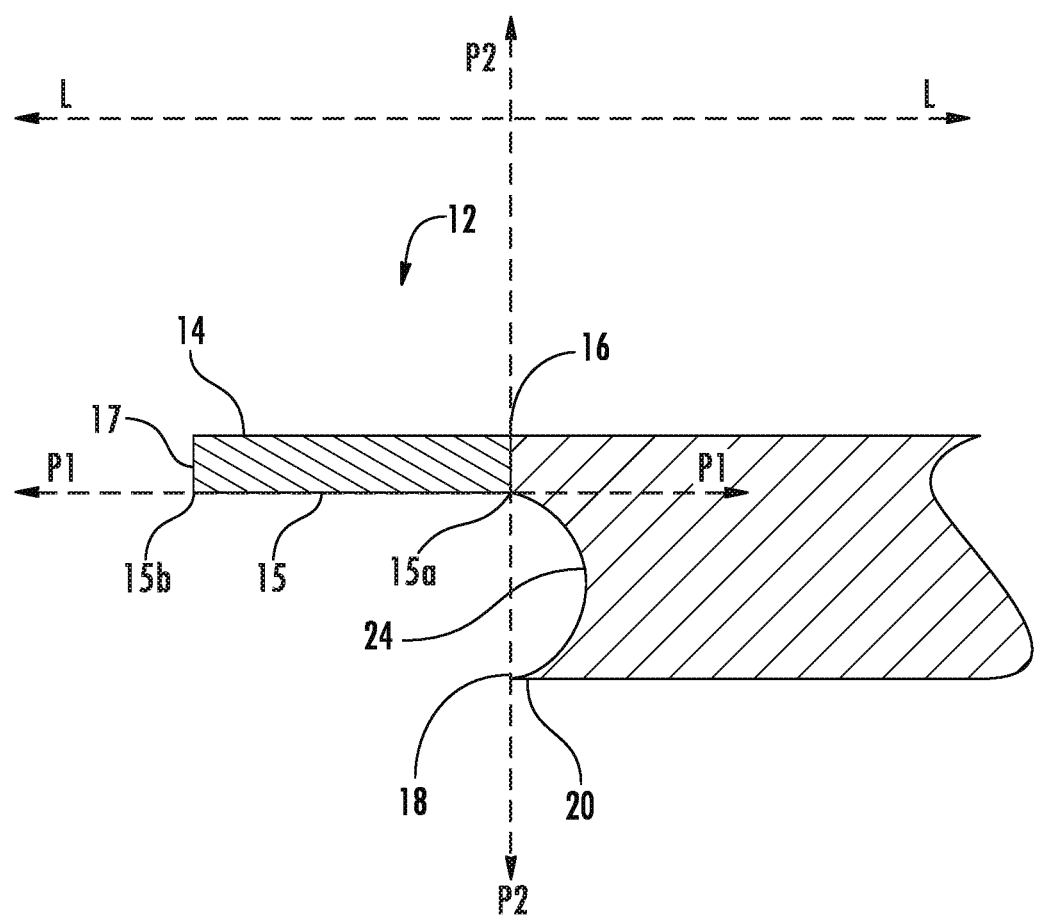
FIG. 1A depicts an enlarged and further annotated view of the cutting portion of the cutting tool of FIG. 1.

Referring to the enlarged and further annotated view of the cutting portion 12 of FIG. 1A, the cutting tool 10 and associated cutting portion 12 has a longitudinal axis L. According to this embodiment, the first cutting edge 14 includes a first sub-edge 15 extending from a proximal end 15a to a distal end 15b and a second sub-edge 17 extending from the distal end 15b of the first sub-edge 15 in a direction that would traverse the longitudinal axis L. As depicted in FIG. 1A, the first sub-edge 15 extends from the proximal end 15a to the distal end 15b along a plane P1 that is substantially parallel to the longitudinal axis L while the second sub-edge 17 is substantially perpendicular to the longitudinal axis L. While it should be understood that the first sub-edge 15 and second sub-edge 17 can take many other forms within the scope of the present disclosure, at least the proximal end 15a and distal end 15b of the first sub-edge 15 are preferably disposed along plane P1 even if the entire first sub-edge 15 does not lie on that plane.

With continued reference to FIG. 1A, the shaping edge 24 extends from the proximal end 15a of the first sub-edge 15 to the second cutting edge 18. More specifically, and as shown in FIG. 1A, the distal end of the second cutting edge 18 is preferably in the form of a pointed tip that also forms the end of the shaping edge 24 opposite the proximal end 15a of the first sub-edge 15. Further, the proximal end 15a of the first sub-edge 15 and the pointed tip of the second cutting edge 18 are preferably disposed together along plane P2 that is substantially perpendicular to the longitudinal axis L. In other words, plane P2 is perpendicular to the longitudinal axis and intersects both the proximal end 15a of the first sub-edge 15 and the distal end (pointed tip) of the second cutting edge 18. As a result of (1) the shaping edge 24 extending from the proximal end 15a of the first sub-edge 15 to the second cutting edge 18; and (2) the proximal end 15a of the first sub-edge 15 being on the same perpendicular plane P2 as the second cutting edge 18, the cutting portion 12 of the cutting tool 10 is configured to remove the finished part at substantially the time the shaping edge 24 is finished forming the finished part.

Referring to FIGS. 2A-2E, a process of forming a finished part is exemplified. According to this embodiment, the shaping edge 24 of the cutting tool 10 is a perimeter of a semi-circle in a concave positon with respect to the first cutting edge 14 and second cutting edge 18. Further, while the first cutting edge 14 extends from a top portion 23 of the shaping edge 24 (i.e., the first cutting edge 14 extends from the top of the semi-circle), the second cutting edge 18 is the bottom portion 25 of the shaping edge 24. As a result, the shaping edge 24 of this embodiment forms a sphere as the finished part 36.

Figure 2A:
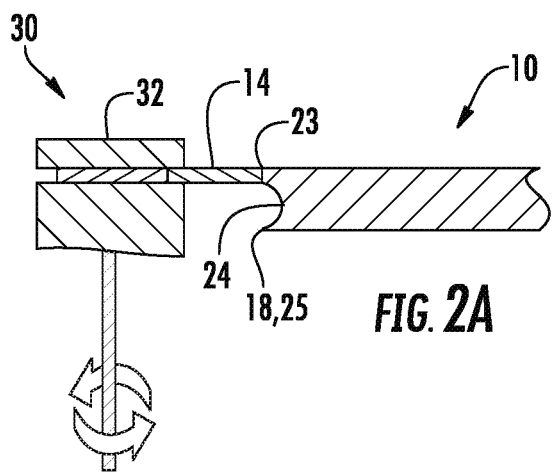
FIG. 2A depicts the cutting tool of FIG. 1 cutting through the trailing end of a rotating workpiece according to one embodiment of the disclosure.
Figure 2B:
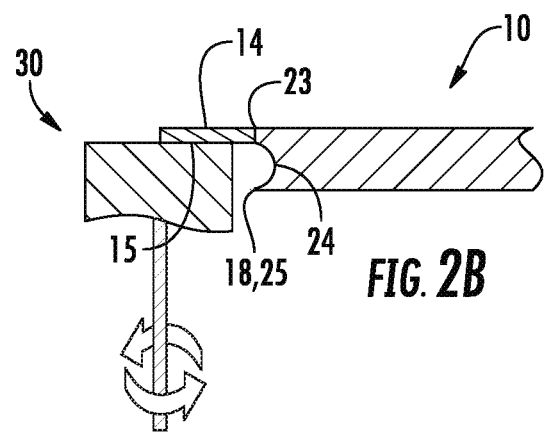
FIG. 2B depicts the cutting tool and workpiece of FIG. 2A after the trailing end of the workpiece has been removed.
Figure 2C:
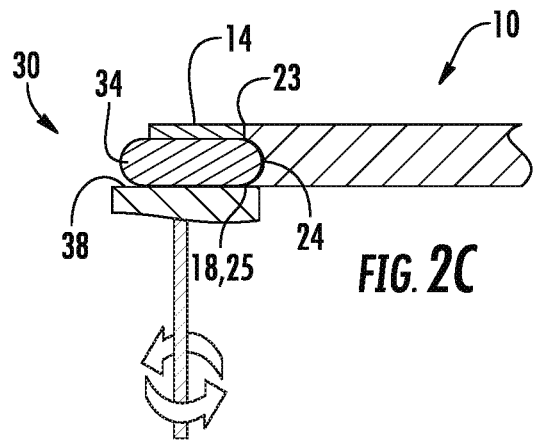
FIGS. 2C-2D depict the cutting tool and workpiece of FIGS. 2A-2B as the shaping edge of the cutting tool shapes a working portion of the workpiece.
Figure 2D:
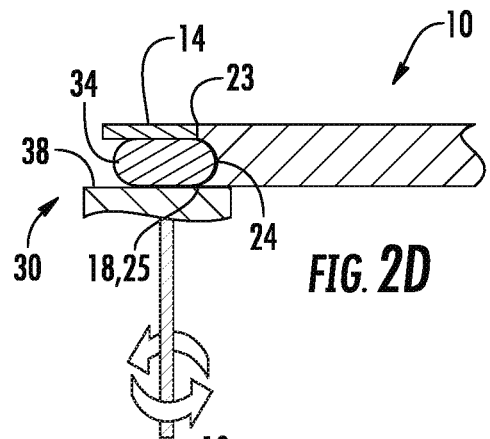
Figure 2E:
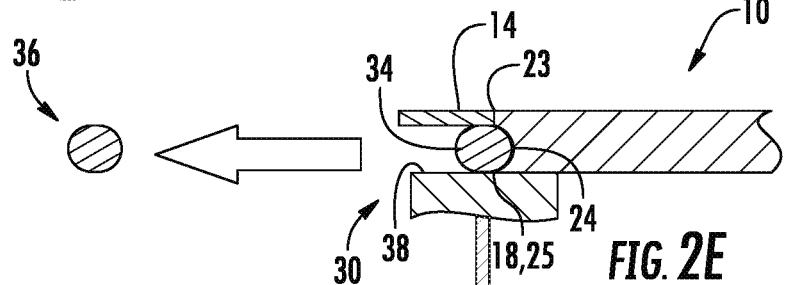
FIG. 2E depicts the cutting tool and workpiece of FIGS. 2A-2D as the second cutting edge of the tool cuts through the leading end of the workpiece to form a finished part.

As shown in FIG. 2A, the cutting tool 10 is advanced into the rotating workpiece such that the first cutting edge 14 starts cutting off the first trailing end 32 of the workpiece 30. Referring to FIG. 2B, the first cutting edge 14 removes the trailing end 32 once the first cutting edge 14 reaches the axial center of the rotating workpiece 30 (more specifically, the distal end 15b of the first sub-edge 15 reaches the axial center). Referring to FIGS. 2C-2D, the cutting tool 10 is continually advanced into the workpiece 30. During this time, the shaping edge 24 is forming the desired shape of the working portion 34 of the workpiece 30 while the second cutting edge 18 is cutting through a leading end 38 of the workpiece 30. It should be understood that the location of the leading end 38 on the workpiece 30 is determined by the positioning of the second cutting edge 18 with respect to the workpiece 30 during machining. In other words, the leading end 38 of the workpiece 30 is undefined until the cutting tool 10 is positioned with respect to the workpiece 30. Referring to FIG. 2E, once the second cutting edge 18 reaches the axial center of the leading end 38 of the rotating workpiece 30 (more specifically, the distal end/pointed tip of the second cutting edge), the working portion 34 is removed from the workpiece 30 in the form of the finished part 36. In preferred embodiments, the finished part is caught in a type of catch pan or screen disposed underneath the rotating workpiece 30.

Depending on the length of the first cutting edge 14 in relation to the width of the workpiece 30, the first cutting edge 14 may cut off the first trailing end 32 of the workpiece 30 prior to the shaping edge 24 contacting the workpiece 30 as shown in FIG. 2B. Alternately, the first cutting edge 14 may cut off the first trailing end 32 while the shaping edge 24 is forming the desired shape of the working portion 34 of the workpiece 30. In yet another embodiment, the first cutting edge 14 and second cutting edge 18 are configured to reach the axial center of the rotating workpiece 30 at precisely the same time such that the first trailing end 32 is removed at the same time as the working portion 34.

Figure 2F:
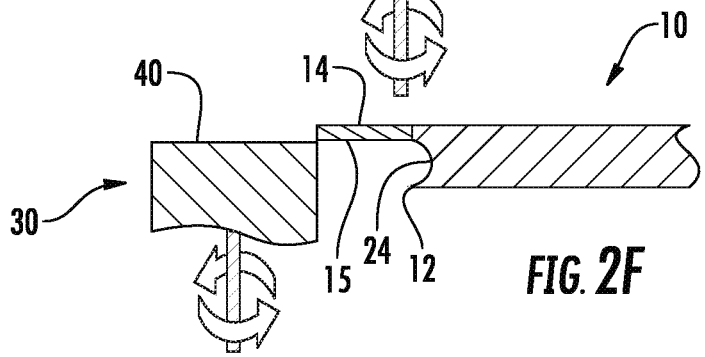
FIG. 2F depicts the cutting tool and workpiece of FIGS. 2A-2E after a finished part is formed and the first cutting edge of the cutting tool is positioned with respect to the newly formed trailing end of the workpiece.

Referring to FIG. 2F, once a finished part 36 is removed from the workpiece 30 as shown in FIG. 2E, what was the leading end 38 of FIG. 2E becomes a new trailing end 40. While the process shown in FIGS. 2A-2E can be repeated to form additional finished parts 36 from the remaining workpiece 30, doing so will result in multiple trailing end 32, 40 pieces being cut from the rotating workpiece as probable waste. To avoid such probable waste, additional finished parts are preferably formed by positioning the first sub-edge 15 of the first cutting edge 14 adjacent a top surface of the newly formed trailing end 40 of the rotating workpiece 30 as shown in FIG. 2F. In other words, forming successive finished parts 36 preferably begins with positioning the cutting tool as shown in FIG. 2F and omitting the step of FIG. 2A as the rotating workpiece 30 should already be "trued" (i.e., clean and sharp) on its new trailing end 40 after the first finished part 36 is formed. The cutting tool 10 is then advanced into the rotating workpiece 30 such that the shaping edge 24 shapes a second working portion between the new trailing end 40 and a new leading end (which is determined by the positioning of the second cutting edge 18) of the rotating workpiece to form a second finished part. As a result, the process of forming finished parts can be quickly repeated after an initial finished part is formed without having to cut off a trailing end of the workpiece, which significantly saves material of the workpiece when a plurality of finished parts 36 are intended to be formed from the same workpiece 30.

According to another aspect of the disclosure, an exemplary application of using the cutting tool 10 of the present disclosure includes cutting a spherical sample from a workpiece substantially as described above and shown with respect to FIGS. 2A-2F for chemical analytical testing of the sample. For example, one or more spherical samples may be cut from a casting lug. In this embodiment, and for purposes of the present disclosure, each "sample" is considered the "finished part," the casting lug would be the "workpiece" from which the sample is taken, and the casted part would be considered a separate part. The sample may then be used to estimate the chemical make-up of the casted part as the sample presumably has the same chemical makeup as the casted part. Advantages of cutting the sample using the cutting tool 10 of the present disclosure include the ability to make one or more samples quickly and efficiently. More specifically, the samples may be created in one directional motion of the cutting tool 10 through the casting lug. Further, a sample may be created as part of the parting step in removing the casted part from the riser. A further advantage is that the spherical sample has an ideal geometry for chemical analytical testing. It is known that the measurement error in many chemical tests is a function of surface area and surface roughness as compared to the volume of the sample. By using a spherical sample with a smooth regular surface according to the present disclosure, the surface area is minimized per unit volume, which reduces the error term significantly.

It should be understood that various shapes can be formed utilizing the teachings of the present disclosure depending on the configuration of the shaping edge 24. According to certain embodiments, the shaping edge 24 is substantially cylindrically shaped as shown in FIGS. 1A-1B and 2A-2F to form rounded finished parts such as spheres, ovals, ellipses, etc. It should also be understood that the length of the second cutting edge 18 in relation to the width of the workpiece 30 determines the length of the finished part 36. For example, to make an ellipse or oval instead of a sphere, the second cutting edge 18 may be lengthened as compared to the second cutting edge 18 of FIGS. 1 and 2A-2F. As a result, the second cutting edge 18 will cut through the leading end 38 of the workpiece 30 before a sphere is formed, resulting in an elliptical or oval shaped finished part 36. As another example, the shaping edge 24 may be substantially perpendicular to the first cutting edge 14 and second cutting edge 18, which would result in a cylindrically shaped finished part 36.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A method of efficiently forming a finished part, the method comprising:
    providing a cutting tool having a longitudinal axis and a solid leading end, the solid leading end including:
        a first cutting edge extending from a first end of the cutting tool in a direction parallel to the longitudinal axis,
        a second cutting edge extending from a second end of the cutting tool, and
        a curved shaping edge disposed between the first cutting edge and the second cutting edge, the curved shaping edge being a concave curve having a center of curvature wherein a distal end of the first cutting edge is positioned a greater distance from the center of curvature than the second cutting edge;
    providing a rotating workpiece, the rotating workpiece including a trailing end, a leading end, and a working portion disposed between the trailing end and the leading end; and
    advancing the solid leading end of the cutting tool into the rotating workpiece along a plane that is parallel to the longitudinal axis of the cutting tool such that the first cutting edge removes the trailing end of the rotating workpiece, the curved shaping edge shapes the working portion of the rotating workpiece, and the second cutting edge removes the working portion of the rotating workpiece to form the finished part, the finished part being one of a sphere and an oval.

2. The method of claim 1 wherein the leading end of the rotating workpiece becomes a new trailing end after forming the finished part, the method further comprising:
    positioning an inner surface of the first cutting edge adjacent a top surface of the new trailing end of the rotating workpiece for preventing wasted material from being removed from the new trailing end; and
    advancing the cutting tool into the rotating workpiece such that the shaping edge shapes a second working portion of the rotating workpiece between the new trailing end and a new leading end of the rotating workpiece until the second cutting edge removes the second working portion of the rotating workpiece to form a second finished part.

3. The method of claim 1 wherein the cutting tool includes a cutting portion that consists of the first cutting edge, the second cutting edge, and the shaping edge.

4. The method of claim 1 wherein the finished part is substantially spherical and the method further includes performing a chemical analytical test on the finished part to determine the chemical makeup of the finished part.

5. The method of claim 1 wherein, when the second cutting edge removes the working portion of the rotating workpiece to form the finished part, the finished part is separated from the cutting tool by gravity.

6. A method of efficiently forming a finished part, the method comprising:
    providing a cutting tool having a longitudinal axis and a solid leading end, the solid leading end including:
        a first cutting edge having a first sub-edge, the first sub-edge including a proximal end and a distal end, the distal end extending from the proximal end in a direction parallel to the longitudinal axis of the cutting tool,
        a second cutting edge having a distal end, the proximal end of the first sub-edge and the distal end of the second cutting edge being disposed together on a plane that is substantially perpendicular to the longitudinal axis such that the distal end of the first sub-edge extends from the plane, and
        a curved shaping edge extending from the proximal end of the first sub-edge to the distal end of the second cutting edge, the curved shaping edge being a concave curve;
    providing a rotating workpiece having a central axis, a trailing end, a leading end, and a working portion disposed between the trailing end and the leading end; and
    advancing the solid leading end of the cutting tool into the rotating workpiece along a plane that is parallel to the longitudinal axis of the cutting tool such that the first cutting edge removes the trailing end of the rotating workpiece when the distal end of the first sub-edge reaches the central axis of the rotating workpiece, the shaping edge shapes the working portion of the rotating workpiece, and the second cutting edge removes the working portion of the rotating workpiece to form the finished part when the distal end of the second cutting edge reaches the central axis of the rotating workpiece, the finished part being one of a sphere and an oval.

7. The method of claim 6 wherein the cutting tool includes a cutting portion that consists of the first cutting edge, the second cutting edge, and the shaping edge.

8. The method of claim 6 wherein the advancing step includes the first cutting edge removing the trailing end of the rotating workpiece prior to the second cutting edge removing the working portion of the rotating workpiece.

9. The method of claim 6 wherein the leading end of the rotating workpiece becomes a new trailing end after forming the finished part, the method further comprising:
    positioning the first sub-edge of the first cutting edge adjacent a top surface of the new trailing end of the rotating workpiece for preventing wasted material from being removed from the new trailing end; and advancing the cutting tool into the rotating workpiece such that the shaping edge shapes a second working portion of the rotating workpiece between the new trailing end and a new leading end of the rotating workpiece until the second cutting edge removes the second working portion of the rotating workpiece to form a second finished part.

10. The method of claim 6 wherein the finished part is substantially spherical and the method further includes performing a chemical analytical test on the finished part to determine the chemical makeup of the finished part.

11. The method of claim 6 wherein, when the second cutting edge removes the working portion of the rotating workpiece to form the finished part, the finished part is separated from the cutting tool by gravity.

* * * * *